Patented Apr. 11, 1944

2,346,127

UNITED STATES PATENT OFFICE 2,346,127

TREATMENT OF SOLVENT REFINED OILS WITH ADSORBENTS

Thomas P. Simpson, John W. Payne, and Peter D. Valas, Woodbury, N. J., assignors to Socony-Vacuum Oil Company, Incorporated, New York, N. Y., a corporation of New York No Drawing. Application March 20, 1941, Serial No. 384,284

6 Claims. (Cl. 196—147)

This application is a continuation-in-part of our copending application S. N. 275,673, filed May 25, 1939.

This invention relates to a method of attaining a higher efficiency in the treating of solvent refined petroleum oils with solid adsorbent filtering materials. The invention particularly relates to a method of treating solvent refined oils with solid adsorbent materials of increased activity and useful life.

Practically all petroleum products require some refining to produce a marketable product. In former years the refining of heavy oils, such as, the lubricating oils almost universally comprised a sulfuric acid treatment for removing undesirable components. Of late years a considerable amount of the sulfuric acid treating of lubricating oils has been eliminated by the advent of solvent refining. In these well-known solvent refining processes, the solvents make preferential selections of the desired components. However, whether the oils are subjected to sulfuric acid treatment or to solvent refining or both, it is common practice to pass the oils through a further refining treatment wherein they are contacted with solid adsorbent materials, such as clays. The clays serve principally to improve the color of the oil, but may also perform additional refining actions. In the usual practice today the oil or the oil with added diluent is percolated through granules of the clay. Our present invention is concerned with the treatment of oils which have been solvent refined as distinguished from the treatment of oils which have been only acid-treated.

In general three different methods are used for refining petroleum oils with clays. These methods are the percolation process wherein liquid oil is percolated through granules of the clay, the contact process wherein liquid oil is contacted with finely pulverized clay and the vapor process wherein oil vapors are passed through granules of the clay. Usually the clays used in vapor processes are transferred to percolation processes after one use and the contact clays are usually discarded after one use.

As may well be appreciated enormous quantities of clays are used throughout the petroleum industry. After the clays have refined a certain amount of oil, they become so contaminated with carbonaceous impurities collected from the oil that they must be regenerated or discarded. Heretofore this regeneration has been effected principally by a chemical combustion which universally consists of burning off the impurities.

In the past various methods have been used for carrying out the burning of granular spent clay. One of the first comprised spreading the clay on an open hearth and burning it. Today, there are three principal methods in general use.

In the first method, the clay falls or cascades over baffles set at about a 45° angle through a flue countercurrent to gases of combustion. In the second method, the clay is regenerated in a rotary kiln slightly inclined from the horizontal. In the third method, which probably is the most commonly used, multiple hearth burners are employed. These multiple hearth furnaces or burners are substantially the same as used in the roasting of ore and are of either the Nichols-Herreshoff or Wedge type. In these burners the clay is slowly rabbled across each hearth, dropping from one to another until the bottom hearth is reached. In all of these conventionally used methods, there is a progressive degradation in the efficiency of the clay with each burning, and finally the clay must be discarded to waste since it is no longer capable of being regenerated sufficiently to warrant further treatment.

The two co-pending applications Serial Number 210,150, filed May 26, 1938, and Serial Number 270,943, filed April 29, 1939, of John W. Payne, disclose and claim two other methods adapted for regenerating clay.

Since clays which have had a different number of burnings by the present conventional processes have different efficiencies, they are kept separate and separately classified. In some of the larger refineries, extensive inventories and bin facilities are required in order to maintain the clays according to their classification or efficiency. Not only do the large inventories of clay, bin facilities, etc. mean added expense, but quite obviously the successive degradation in efficiency, and the corresponding requirement of more clay increases the expense.

Most important amongst the disadvantages of the commonly used clay regeneration methods, however, is the fact the clay can only be regenerated a very limited number of times before its efficiency is so low that it does not pay to regenerate it, at which time the clay is thrown away to waste. In general, granular petroleum filter clays are only regenerated seven or eight times, and practically never more than ten or fifteen times at which time their efficiency is reduced to about 50% of the original, and they are thrown away. As stated above, the finely pulverized contact clays, e. g., 200 mesh or finer, are usually never regenerated.

In order to further stress the tremendous importance of the problem involved it might be pointed out that over the United States there are roughly 5,000 tons of clay regenerated each day with the attendant degradation in efficiency accepted by the art. Furthermore, each year the petroleum industry purchases about 225,000 tons of new fuller's earth alone, representing an expense of over four million dollars, and discards to waste roughly 200,000 tons of clay that is considered too spent to warrant regeneration.

It is a well-known fact that every heavy oil refinery in the country has large dumps of spent clays that have been thrown away to complete waste. In some cases, this waste clay is left as a dump, and in other cases, it is used for filling in low land, sold for fertilizer, etc. However, in all cases, there is this enormous discarding of spent clays. Such waste is accepted as a necessary evil of the process.

There have been a few suggestions from time to time in other fields that clays might be regenerated to higher efficiency. Likewise, in the petroleum industry, it has been suggested that a particular form of clay under very special conditions might be regenerated to higher efficiency. However, the fact other methods have not been taken up by the petroleum industry is believed conclusive that other known regeneration processes than those now used are not feasible for treatment of the clays used in refining petroleum, or it is not obvious that they could be applied to regenerating petroleum clays. While such a fact is not usually so conclusive, it is believed to be in the present case, in view of the tremendous amounts of clay used and thrown away to waste each year as shown above, and the increased amounts necessary because of the successive losses in efficiency as well as other attending disadvantages. Certainly, it cannot be maintained that one of the country's largest industries would go on year after year suffering the above-mentioned wastes and disadvantages, if a remedy therefor was obvious.

It is an object of our invention to provide an improved method of treating solvent refined petroleum oils with solid adsorbent materials by using adsorbents possessing higher refining activity for solvent refined oils.

Another object is to provide a method of treating solvent refined petroleum oils with adsorbents, such as, clays and the like, wherein the adsorbents have a greater refining activity than in their conventionally used fresh state, and wherein said adsorbents may be indefinitely regenerated to high efficiency.

A further object is to provide a commercially feasible method of treating solvent refined petroleum oils with adsorbent materials, such as, clays, and the like, which have been reclaimed from discarded petroleum filter materials.

Still another object is to provide a method of treating solvent refined petroleum oils with adsorbent materials, such as, clays, and the like, wherein the adsorbents do not suffer successive degradation in efficiency with successive regenerations.

The present invention comprises subjecting finely divided porous materials which have carbonaceous matter associated therewith to a carbonizing treatment whereby the carbonaceous matter is converted to a deposit of activated carbon on the porous material, and then treating solvent refined petroleum oils with the carbonized material. While it may be found desirable at each activation treatment or at intermittent treatments to burn off part of the carbonaceous matter or carbon associated with the clay or other porous material, the essential feature is that at each treatment at least a sufficient portion of the carbonaceous product associated with the clay is carbonized on the clay to a highly active carbon deposit, to give the clay an enhanced refining activity. We recommend that the activated carbon layer comprises at least about 2% by weight of the adsorbent.

We disclose in our co-pending application Serial Number 275,672, filed May 25, 1939, the advantages of carbonizing petroleum refining clays in general, and point out therein that contrary to the conventional regeneration processes of today which regard the carbonaceous impurities as a complete evil which clogs the porous structure of the adsorbent, and which must be burned off, our carbonizing process makes use of at least a portion of this carbonaceous impurity by converting it to an activated carbon deposite on the clay. In our co-pending case S. N. 275,673, we claim the invention based on the discovery that adsorbents having petroleum matter carbonized thereon have a refining activity for solvent refined oils that is far superior to even its own activity for other oils. The present invention is generic to this latter process, and is based on the discovery that carbonaceous matter in general, whether mineral, vegetable, or animal, can be carbonized onto adsorbents, and the carbonized adsorbents used for refining solvent refined oils with the advantages set forth in application S. N. 275,673.

It must be admitted, of course, that activated carbon is a known adsorbent material. However, as pointed out hereinabove, despite the long recognized disadvantages and wastes of the conventional clay regeneration methods, the long desire for improvement, and the many attempts to improve, it has never occurred to the petroleum industry that the petroleum oil impurities deposited on their clay adsorbents, or other carbonaceous matter placed thereon, could be successfully and feasibly converted to activated carbon which would give the clay even as efficient activity as it would have by completely burning off the impurities, and it certainly has never occurred to the art that such carbonized clays had far greater activity for solvent refined oils than for acid-treated oils. Accordingly, the art goes on today regenerating the clays, such as, used in the percolation methods, in the manner set forth above, resigning itself to the decreased efficiencies, and discarding to waste enormous quantities annually. The finely pulverized clays used in contact processes, although not so commonly used, are as stated above generally discarded to waste after the first use with no attempt to regenerate since a process considered feasible for their regeneration has not been suggested. Therefore, the present invention is particularly feasible for contact clays since they may be contacted with oil, carbonized, then the above cycle repeated many times, and thereby a contact adsorbent is afformed, having substantially greater efficiency than the uncarbonized clay. Moreover, it is to be understood, that by our process contact clays may be contacted with carbonaceous matter, carbonized, and then the above cycle repeated several times.

The method of activating or regenerating clay for our process necessitates but little change in the present burning methods and means for regenerating clays. While other methods might be devised which incorporate the principles of our invention, it is preferred to operate in a manner closely analogous to present burning method, thus increasing the commercial acceptability of the process.

Accordingly, the activation or regeneration may be carried out by heating, for instance, spent petroleum filter clays under the well-known clay burning conditions of time, temperature, etc., but with control of the atmosphere contacting the clay in such manner that the regenerated clay carries an activated carbon deposit rather than having all the impurities burned off. The carbonized clays thus produced are used in the conventional methods for treating solvent refined oils with clays.

It has been found that the temperature of our carbonizing regenerating or activating process may be varied over a considerably wider range than is desirable in the clay burning regeneration methods now being used. Thus in our regenerating process the temperatures required for destructive distillation of the adsorbed petroleum products may vary from that necessary to provide incipient distillation up to that which will be damaging to the clay under the circumstances. In the conventional regenerating methods wherein the impurities are burned from the clay an extremely close temperature control should be maintained as otherwise inefficient regeneration or damage to the clay results. The temperature for clay burning should preferably be maintained substantially within the range of 950°–1150° F. However, in the present process it has been found that the carbonization regeneration may be effected, for instance, within the range of about 900°–1500° F. with equal success. This is of itself a distinct advantage since there is less chance of damaging the clay. The optimum time of heating varies from a few seconds at 1500° F. to several minutes at 1000° F.

The important feature in activating or regenerating by the present process is proper control of the atmosphere in the regenerating or activating zone. The essential feature is to sufficiently restrict the amount of air or other carbon oxidizing gas in the zone that complete combustion or oxidation of the petroleum products will not occur. It has been found that carbonization takes place both in the complete absence of air or other carbon oxidizing gas, and also in the presence of limited amounts of air provided the quantities are insufficient to oxidize the activated carbon from the clay. Thus in carrying out the carbonization, the heating zone may be completely sealed and no air admitted, or a limited amount of air may be admitted with or without other inert gases. It has also been found that, if desired, steam may be admitted to the carbonizing zone. The presence of steam facilitates the removal of hydrocarbon vapors and reduces the rate of carbon build-up on the clay. For some oils, it appears carbonizing in the presence of steam gives slightly better results, however, in general, reactivation is approximately the same for all the above carbonizing methods.

In practice we prefer to carry out our regenerating process in apparatuses, such as, disclosed in the two co-pending applications Serial Number 270,942, and Serial Number 279,008, filed April 29, 1939, and June 14, 1939, respectively, of John W. Payne wherein the clay is passed through the regenerating zone in close proximity to a liquid heat transfer medium. These apparatuses have several construction and operating advantages over other known regenerating kilns. In regenerating clays by burning, as is now commonly done in the art, an extremely close temperature control should be maintained, and for such regenerations the above-mentioned Payne apparatuses are highly advantageous on this point alone. Furthermore, the apparatus disclosed in Serial Number 270,942 is well-suited for regenerating the finely divided contact clays as well as the granular clays, the clays being carried through the apparatus suspended in a gaseous medium. However, as mentioned hereinabove, the close temperature control of burning regenerations is not necessary in the present carbonizing process. Accordingly insofar as the degree of reactivation is concerned the present process may be carried out in other apparatuses, such as, the baffled vertical flue, rotary kiln, or multiple hearth kilns now in common use in the industry with equal success, the clays being passed through these kilns in the same manner in which they are under burning methods, it being understood, of course, that in any apparatus used, appropriate provision must be made for controlling the amount of air or other combustion supporting gas admitted to the carbonizing zone. It is believed, however, that in any commercial set-up, it will be found desirable to do a certain amount of burning as well as carbonizing. Accordingly, it is preferable to employ one of the Payne apparatuses, as then the one apparatus may be used for both the burning and the carbonizing. Otherwise, if it is desired to obtain the advantages in burning that may be given by the Payne apparatuses, separate kilns must be used for the carbonizing and the burning.

A considerable amount of research, experimenting and testing has been done in developing and establishing the present invention. In order to clearly establish the surprising improvements which the present invention makes over the present conventional regeneration methods, a substantial amount of data will be set forth herein. All of the activity tests are tests of the decolorizing efficiency of the clay by the percolation method, and the values are based on fresh clay as being 100%. The number of the clay indicates the number of times, it has been regenerated (by conventional burning or the present carbonizing as indicated after the number). Various petroleum stocks were used in the tests, and they are as follows:

| Stock | Sp. Gr. | S. U. viscosity | Crude source | Treatment before filtration |
|---|---|---|---|---|
| A | .880 | 245–254 @ 130° F | Okla. City (resid.) | Duo Sol (solvent ref.) |
| B | .885 | 88–90 @ 210° F | do | Do. |
| C | .884 | 98–101 @ 210° F | do | Do. |
| D | .915 | 145–155 @ 210° F | do | Do. |
| E | .881 | 85–90 @ 210° F | do | Sulfuric acid ref. |
| F | .925 | 61–63 @ 210° F | Coastal (distillate) | Do. |
| G | .905 | 320–330 @ 100° F | Coastal (dist.)+paraffine (dist.) | Do. |
| H | .876 | 55–60 @ 210° F | Pa. Bright Stock+Pa. Neutral | Chlorex (solvent ref.) |

It will be recalled that one of the principal objects of the present invention was the regeneration of clay to a higher activity than is obtainable by present methods in common use. That such object has been attained to a high degree by the present invention can be seen clearly from the following data:

TABLE I

*Comparative yields from burned and carbonized clay*

| Stock | Clay | Per cent percolation efficiency (without naphtha dilution) | |
|---|---|---|---|
| | | Multiple hearth burned clay | Carbonized clay |
| A | Fresh burned | 100 | 100 |
| | No. 10 | 55 | 217 |
| | Av. No. 1 to No. 10 | 66 | 193 |
| B | Fresh burned | 100 | 100 |
| | No. 10 | 50 | 250 |
| | Av. No. 1 to No. 10 | 63 | 246 |
| C | Fresh burned | 100 | 100 |
| | No. 9 | 52 | 125 |
| | Av. No. 1 to No. 9 | 66 | 131 |
| D | Fresh burned | 100 | 100 |
| | No. 10 | 65 | 220 |
| H | Fresh burned | 100 | 100 |
| | No. 1 | 88 | 117 |
| | No. 2 | 93 | 130 |
| | No. 3 | 66 | 130 |

The tremendous improvement and advancement of the art by the present process is apparent from the table. With all the oils treated, the carbonized clay showed marked improvement over the corresponding burned clay. It is needless to point out the commercial advantage of such increased activity. It will be noted that on some of these oils, the activity of the carbonized clay goes even above 200%. Furthermore that clays which have been burned 10 times and upon another burning regeneration have an efficiency around 50, at which time, they would usually be discarded to waste, may be regenerated by our carbonizing process and have their efficiency go up above 200%.

It was pointed out in our co-pending application Serial Number 275,672, filed May 25, 1939, that there is a distinct advantage in the use of our carbonized clays for treating petroleum oils. It has now been found that for unknown reasons carbonized clays display unusually high activities with respect to solvent refined oils, and particularly for oils which have been solvent refined by the Duo-Sol process, the activity for these oils far surpassing even their own activities on acid treated oils. This important discovery is clearly demonstrated by the following data:

TABLE II

*Solvent refined oils*

| Clay method of reactivation | Stock A,[1] percolated to 55 Lov. straight | Solution (A) | Stock B,[2] percolated to 75 Lov. straight | Solution (A) | Stock C,[3] percolated to 12.5 Lov. straight |
|---|---|---|---|---|---|
| Car No. 1 fresh clay | 173 | 138 | 194 | 123 | 125 |
| No. 2 fresh clay | 183 | 159 | 248 | 161 | 125 |
| No. 3 fresh clay | 183 | 100 | 186 | 149 | 131 |
| No. 4 fresh clay | 183 | 145 | 186 | 134 | 131 |
| No. 5 fresh clay | 210 | 143 | 209 | 155 | 137 |
| No. 6 fresh clay | 206 | 140 | 388 | | 137 |
| No. 7 fresh clay | 206 | | | | 131 |
| No. 8 fresh clay | 165 | 138 | | | 131 |
| No. 9 fresh clay | 286 | | | | 125 |
| No. 10 fresh clay | 237 | | | | |
| No. 11 fresh clay | 286 | | 358 | | |
| No. 12 fresh clay | | | 410 | | |
| No. 13 fresh clay | 173 | | | | |
| No. 14 fresh clay | 194 | | | | |
| No. 15 fresh clay | | | 209 | | |
| Average | 206 | 138 | 266 | 144 | 130 |

*Acid treated stocks*

| | Stock F,[4] percolated to 5 Lov. straight | Stock 686,[5] percolated to 1.2 Lov. straight | Stock E,[6] percolated to 190 Lov. straight | Solution (A) |
|---|---|---|---|---|
| Carbonization of fresh clay No. 1 | 100 | 116 | 130 | 135 |
| Carbonization of fresh clay No. 2 | 95 | 93 | 97 | 80 |
| Carbonization of fresh clay No. 3 | 100 | 67 | 76 | 92 |
| Carbonization of fresh clay No. 4 | 115 | 77 | 76 | 84 |
| Carbonization of fresh clay No. 5 | 85 | 53 | | |
| Carbonization of fresh clay No. 6 | 95 | 77 | | |
| Carbonization of fresh clay No. 7 | 110 | | | |
| Carbonization of fresh clay No. 8 | 85 | | | |
| Carbonization of fresh clay No. 9 | 95 | | | |
| Carbonization of fresh clay No. 10 | 80 | | | |
| Average | 96 | 80 | 95 | 98 |

[1] Initial Color 105 Lovibond (¼" cell).
[2] Initial Color 120 Lovibond (¼" cell).
[3] Initial Color 95 Lovibond (¼" cell).
[4] Initial Color 15 Lovibond (¼" cell).
[5] Initial Color 316 Lovibond (¼" cell).
[6] Initial Color <750 Lovibond (¼" cell).

(A) Solution consists of 50% (vol.) oil and 50% (vol.) of naphtha. Yields are based on reduced oil.

Thus, while our carbonized clays may be used with advantage on any oils, it is apparent from the above data that such clays have a tremendously greater activity for solvent refined oils and suffers practically no degradation in efficiency with additional carbonizations. The above table shows that the successive degradation in efficiency which is always obtained with burning regenerations is not obtained with carbonizing but instead the activities come back time after time to a high level which is even above that of the fresh clay. As mentioned hereinabove, under present day conventional burning regenerations, the clays are thrown away after 7 to 10 regenerations. From the above table, it is seen that at 7 to 10 regenerations by our process the efficiency of the clay is still at a very high level, and that the efficiency stays at the high level upon further regenerations. Theoretically clays could be regenerated forever by our process, however, by present methods and means of regeneration there is about a 2% mechanical loss of clay from handling with each regeneration. Therefore, the clay is lost through handling before it reaches a point at which regeneration is not feasible. As the loss is about 2% per regeneration, this would mean the clay could be regenerated in practice about 50 times.

One of the most surprising and important features of the present invention is the fact that clays which have been regenerated by conventional burning methods until their efficiency is so low it no longer pays to regenerate them, i. e., they have been burned about 10 times and their efficiency is around 50 or 60, may now be subjected to our carbonizing treatment and their efficiency becomes greater than the original fresh clay. More surprising still is the fact it is possible to reclaim these burned clays that have been thrown away. For instance, it is possible to bring in discarded clays off the dumps at the refinery which, as explained above, have been thrown away because of their low efficiency and subject these discarded clays to our carbonizing process and bring their efficiency or activity up to a value which is greater than that possessed by the original fresh clay. In the case of discarded contact clay, it has also been found feasible to convert same to granular clay by extrusion, e. g., forming 30/60 mesh granules, carbonize these "synthetic" granules and use them in percolation treatments of solvent refined oils. The following data illustrates the type results that may be obtained with reclaimed discarded petroleum filter clays:

TABLE III

Clay—Method of reactivation

| | Stock A percolated to 55 Lov. straight | Stock B percolated to 75 Lov. straight |
|---|---|---|
| Carbonization No. 1 of No. 10 refinery clay | 140 | 164 |
| Carbonization No. 2 of No. 10 refinery clay | 149 | 248 |
| Carbonization No. 3 of No. 10 refinery clay | 129 | 201 |
| Carbonization No. 4 of No. 10 refinery clay | 131 | 170 |
| Carbonization No. 5 of No. 10 refinery clay | 125 | 124 |
| Carbonization No. 6 of No. 10 refinery clay | 139 | 128 |
| Carbonization No. 7 of No. 10 refinery clay | 149 | 194 |
| Carbonization No. 8 of No. 10 refinery clay | 163 | 239 |
| Carbonization No. 9 of No. 10 refinery clay | 163 | 239 |
| Carbonization No. 10 of No. 10 refinery clay | 159 | |
| Average | 145 | 190 |

In order to demonstrate clearly that the carbonaceous matter which is carbonized on the adsorbents need not be petroleum, exemplary data are given in Table IV below, showing results wherein typical carbonaceous materials from the animal and vegetable kingdoms were carbonized on the adsorbents prior to their use for decolorizing a Duo Sol solvent refined Mid-Continent residual stock.

TABLE IV

| | Adsorbent | Per cent wt. carbon on adsorbent | Adsorbent density | Per cent decolorizing efficiency |
|---|---|---|---|---|
| 1 | Fresh burned clay | 0 | .496 | 100 |
| 2 | ----do---- | 0 | .499 | 100 |
| 3 | Carbonized clay from lard impregnation | 2.38 | .533 | 203 |
| 4 | Same as No. 3 | 2.38 | .525 | 209 |
| 5 | Carbonized clay from olive oil impregnation | 2.25 | .532 | 199 |
| 6 | Same as No. 5 | 2.25 | .533 | 200 |
| 7 | Carbonized clay from molasses impregnation | 9.15 | .586 | 188 |
| 8 | Same as No. 7 | 9.15 | .585 | 188 |

The tremendously important commercial aspects of all the features of our invention should be readily apparent from the foregoing data. It is obvious from the data that very substantial savings may be made over present processes.

Since it may not be apparent from the data, it might be well to state that carbonized or burned clays which have been used for refining acid treated oils may be subjected to a carbonizing treatment, and it is then used for refining solvent refined oils, and it is found that their activity for the solvent refined oils is of the extremely high nature of the clays shown in the tables.

The physical characteristics and oxidation stability of oils percolated through our carbonized clays are approximately the same as those of oils percolated to the same blend color through conventionally burned clays as is shown by Table V.

TABLE V

Properties of oils percolated through carbonized and plant burned clays

| | Stock | Type of clay | Color | | S. U. V. @— | | V. I. |
|---|---|---|---|---|---|---|---|
| | | | Lovibond (¼″ cell) | Story (1″ cell) | 100° F. | 210° F. | |
| 1 | A | Fresh burned clay | 55 | 56 | | | |
| 2 | A | No. 7–10 plant burned clay | 55 | 62 | | | |
| 3 | A | Fresh clay burned after 11 carbonizations | 52 | 46 | | | |
| 4 | A | Fr. clay after 2 carbon | 55 | 52 | | | |
| 5 | A | Fr. clay after 5 carbon | 55 | 50 | 577 | 67.3 | 96 |
| 6 | A | Fr. clay after 11 carbon | 55 | 52 | 579 | 67.3 | 96 |
| 7 | A | Fr. clay after 14 carbon | 55 | 54 | 580 | 67.7 | 96.8 |

TABLE V—(Continued)

| Stock | | Type of clay | Color | | S. U. V.@— | | V. I. |
|---|---|---|---|---|---|---|---|
| | | | Lovibond (¼" cell) | Story (1" cell) | 100° F. | 210° F. | |
| 8 | A | No. 10 plant clay after 2 carbonizations | 53 | 50 | | | |
| 9 | A | After 4 carbonizations | 55 | 50 | 578 | 67.2 | 96 |
| 10 | A | No. 7-10 plant clay after 1 carbonization | 57 | 57 | 571 | 66.9 | 95.4 |
| 11 | A | Fresh clay after 1 car. without steam | 57 | 59 | | | |
| 12 | A | Fresh clay after 4 car. without steam | 56 | 54 | 576 | 67.3 | 96.1 |
| 13 | B | Fresh burned clay | 72 | 87 | 1,049 | 90.6 | 95.6 |
| 14 | B | No. 5-10 plant burned clay | 73 | 91 | 1,042 | 90.4 | 95.8 |
| 15 | B | Fr. clay burned after 15 carbonizations | 75 | 81 | 973 | 87.1 | 95.6 |
| 16 | B | Fr. clay after 2 carbon | 75 | 91 | 1,058 | 91.6 | 96.6 |
| 17 | B | Fr. clay after 10 carbon | 75 | 93 | 1,063 | 91.4 | 95.6 |
| 18 | B | No. 5-10 plant clay after 1 carbonization | 75 | 79 | 1,002 | 88.4 | 95.1 |
| 19 | B | No. 10 plant clay after 2 carbonizations | 76 | 85 | 1,064 | 91.2 | 95.3 |
| 20 | B | After 4 carbonizations | 75 | 81 | 998 | 88.2 | 95.8 |
| 21 | C | Fresh burned clay | 12.5 | 8.0 | | | |
| 22 | C | Clay burned after 6 carbonizations | 12.5 | 8.0 | | | |
| 23 | C | Fr. clay after 5 carbon | 15.0 | 13.5 | | | |
| 24 | C | Fr. clay after 9 carbon | 12.5 | 9.0 | | | |

In addition to the advantages set forth hereinabove, it has been found that certain other advantages are obtained by using our carbonized clays in the refining of solvent refined petroleum oils. It has been found that when a Duo Sol treated oil is percolated through burned clay, the color of the filter stream becomes darker by relatively constant color increments and is soon darker than the charge oil. Percolation of Duo Sol treated oil through our carbonized clay, however, results in stream colors which darken by progressively smaller color increments, thus resulting in larger filter yields. The stream colors are approximately the same for percolation of acid-treated oils through either burned clay or carbonized clay. (The percolation yields of Duo Sol refined oils are considerably higher for straight percolation than for solution percolation, but the percolation yield of acid treated oils is approximately the same.) The color of the wash oil from carbonized clay is about the same as that of normally burned clay.

A further advantage of the present process results from a more efficient activation or regeneration that is possible. Because of this more efficient regeneration, smaller inventories of clay are required and consequently less capital investment. Moreover, the extensive classifications and bin facilities required by present day conventional methods of regeneration may be eliminated. Under the present process, the clay need only be separated into two classes, that is, fresh clay and revivified or carbonized clay.

While the invention has been described hereinbefore, principally with respect to regeneration of spent clays, the invention may be made use of to increase the activity of fresh clay. Thus, fresh clay may be dipped or otherwise coated with a suitable petroleum oil, and then subjected to our carbonizing process, thereby giving it an activity which is greater than its original activity. It is in such operations that the use of carbonaceous materials other than petroleum is more important.

The invention has been described in detail with respect to treatment of petroleum refining clays. While clays, and particularly fuller's earth, are by far the most commonly used solid adsorbent means for refining petroleum today, other solid adsorbent materials, such as, bauxite, silica, gel, etc., are used to a limited extent in place of clays. It is understood that the present invention is applicable to these other solid adsorbent refining materials that may be used in place of clays, and, in fact, any finely divided porous material which does not have a deleterious chemical action of its own may be used as the carrier for the activated carbon deposit.

We claim:

1. In the method of treating oils which have been partially refined by subjection to the action of preferential solvents for the removal of impurities and the subsequent separation of the dissolved impurities from the remaining stock, the steps which comprise contacting said remaining stock with a porous, solid, inorganic adsorbent, having thereon a deposit of carbonaceous material added to the adsorbent and less than all of which has been burned off to leave a residual deposit of activated carbon.

2. The method of increasing the efficiency of a decolorizing operation for oils which have been partially refined by subjection to the action of preferential solvents for the removal of impurities, subsequent separation of the dissolved impurities from the remaining stock and treatment of the remaining stock with a solid, inorganic adsorbent in particle form, the improvement which comprises impregnating the particles of adsorbent with carbonaceous material, carbonizing said carbonaceous material to form an active carbon deposit on said particles of adsorbent before contacting with said remaining stock, whereby the efficiency of the carbonized adsorbent for solvent refined oils is substantially greater than the efficiency of the adsorbent in its fresh state.

3. The method of claim 2 wherein the activated carbon deposit on the inorganic solid adsorbent is equal in amount to at least 2 per cent by weight of the particles.

4. The method of claim 2 wherein the carbonaceous material is selected from the mineral kingdom.

5. The method of claim 2 wherein the carbonaceous material is selected from the vegetable kingdom.

6. The method of claim 2 wherein the carbonaceous material is selected from the animal kingdom.

THOMAS P. SIMPSON.
JOHN W. PAYNE.
PETER D. VALAS.